United States Patent
Yang et al.

(10) Patent No.: US 9,581,730 B2
(45) Date of Patent: Feb. 28, 2017

(54) SUBSTRATE FILM

(71) Applicant: LG Chem, Ltd., Seoul (KR)

(72) Inventors: Se Woo Yang, Daejeon (KR); Sung Hyun Nam, Daejeon (KR); Kyun Il Rah, Daejeon (KR); Yoon Tae Hwang, Daejeon (KR); Jong Hyun Jung, Daejeon (KR); Hye Min Yu, Daejeon (KR); Ji Young Hwang, Daejeon (KR); Eun Suk Park, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 14/787,436

(22) PCT Filed: Jun. 19, 2014

(86) PCT No.: PCT/KR2014/005441
§ 371 (c)(1),
(2) Date: Oct. 27, 2015

(87) PCT Pub. No.: WO2014/204248
PCT Pub. Date: Dec. 24, 2014

(65) Prior Publication Data
US 2016/0195641 A1    Jul. 7, 2016

(30) Foreign Application Priority Data

Jun. 19, 2013 (KR) .......... 10-2013-0070530
Oct. 18, 2013 (KR) .......... 10-2013-0124858

(51) Int. Cl.
*G02B 1/08* (2006.01)
*B32B 27/08* (2006.01)
(Continued)

(52) U.S. Cl.
CPC .......... *G02B 1/08* (2013.01); *B29C 55/005* (2013.01); *B29C 55/02* (2013.01); *B29C 55/023* (2013.01);
(Continued)

(58) Field of Classification Search
CPC ..... B29C 55/005; B29C 55/026; B29C 55/30; B29K 2075/00; B29K 2229/04;
(Continued)

(56) References Cited

U.S. PATENT DOCUMENTS

2004/0212885 A1    10/2004  Mizushima et al.
2006/0108708 A1*    5/2006  Wakita .................. B32B 27/40
                                                                         264/248
(Continued)

FOREIGN PATENT DOCUMENTS

CN    102385086 A    3/2012
JP    S61104847 A    5/1986
(Continued)

OTHER PUBLICATIONS

International Search Report from PCT/KR2014/005441, dated Sep. 23, 2014.
(Continued)

*Primary Examiner* — Thao T Tran
(74) *Attorney, Agent, or Firm* — Lerner, David, Littenberg, Krumholz & Mentlik, LLP

(57) ABSTRACT

There are provided a substrate film, a laminate, and method of manufacturing a polarizing film. The present application provides a substrate film capable of effectively manufacturing a polarizing film having a thickness of about 10 μm or less, about 8 μm or less, about 7 μm or less, about 6 μm or less, or about 5 μm or less and having an excellent function such as polarization performance, a laminate, and a method of manufacturing the same. According to the invention, it is
(Continued)

possible to prevent tearing, curling, or the like from occurring in the elongation process and manufacture a polarizing film by easily elongating a polarization material such as a PVA-based resin.

18 Claims, 1 Drawing Sheet

(51) Int. Cl.

| | | |
|---|---|---|
| B32B 27/30 | (2006.01) | |
| B32B 27/40 | (2006.01) | |
| B29C 55/00 | (2006.01) | |
| C08J 5/18 | (2006.01) | |
| B32B 27/00 | (2006.01) | |
| B29C 55/02 | (2006.01) | |
| B29K 55/00 | (2006.01) | |
| B29K 75/00 | (2006.01) | |
| B29L 9/00 | (2006.01) | |
| B29C 55/04 | (2006.01) | |

(52) U.S. Cl.
CPC .............. *B32B 27/00* (2013.01); *B32B 27/08* (2013.01); *B32B 27/306* (2013.01); *B32B 27/40* (2013.01); *C08J 5/18* (2013.01); *B29C 55/04* (2013.01); *B29K 2055/00* (2013.01); *B29K 2075/00* (2013.01); *B29L 2009/00* (2013.01); *B32B 2250/02* (2013.01); *B32B 2250/24* (2013.01); *B32B 2307/42* (2013.01); *B32B 2551/00* (2013.01); *C08J 2375/04* (2013.01)

(58) Field of Classification Search
CPC .............. B29L 2009/00; B32B 2250/02; B32B 2250/24; B32B 2307/42; B32B 2551/00; B32B 27/40; B32B 27/306; C08J 2375/04; C08J 5/18; G02B 1/08
USPC .......................................... 428/423.1, 424, 4
See application file for complete search history.

(56) References Cited

U.S. PATENT DOCUMENTS

| | | |
|---|---|---|
| 2006/0109403 A1 | 5/2006 | Murakami et al. |
| 2008/0269454 A1* | 10/2008 | Chen et al. ..................... 528/67 |
| 2009/0252897 A1 | 10/2009 | Matsuo et al. |
| 2009/0286031 A1 | 11/2009 | Shi et al. |
| 2010/0157426 A1* | 6/2010 | Matsunami ........... B29C 55/023 359/487.06 |
| 2011/0315306 A1 | 12/2011 | Goto et al. |
| 2012/0055607 A1 | 3/2012 | Kitagawa et al. |
| 2012/0300300 A1* | 11/2012 | Yasui ................... C09J 133/066 359/492.01 |
| 2012/0327512 A1 | 12/2012 | Goto et al. |
| 2013/0100529 A1 | 4/2013 | Kitagawa et al. |
| 2013/0135725 A1 | 5/2013 | Mori et al. |
| 2014/0072731 A1 | 3/2014 | Seo et al. |

FOREIGN PATENT DOCUMENTS

| | | |
|---|---|---|
| JP | S63243143 A | 10/1988 |
| JP | 2000338329 A | 12/2000 |
| JP | 2005104048 A | 4/2005 |
| JP | 2011121253 A | 6/2011 |
| JP | 4751481 B1 | 8/2011 |
| JP | 4751486 B2 | 8/2011 |
| JP | 2012-159778 A | 8/2012 |
| JP | 2012145766 A | 8/2012 |
| JP | 2012-215775 A | 11/2012 |
| JP | 2013011838 A | 1/2013 |
| KR | 10-2006-0133215 A | 12/2006 |
| KR | 10-0755763 B1 | 9/2007 |
| KR | 10-0812579 B1 | 3/2008 |
| KR | 10-2011-0006679 A | 1/2011 |
| KR | 10-2011-0069352 A | 6/2011 |
| KR | 103121222 A | 11/2011 |
| KR | 10-1175700 B1 | 8/2012 |
| KR | 20120087068 A | 8/2012 |
| KR | 10-2013-0013471 A | 2/2013 |
| KR | 20140072731 A1 | 4/2013 |
| KR | 10-1274056 B1 | 6/2013 |
| WO | 2010100917 A1 | 9/2010 |
| WO | 2013055158 A2 | 4/2013 |

OTHER PUBLICATIONS

International Search Report for Application No. PCT/KR2014/005440 dated Sep. 26, 2014.
International Written Opinion for Application No. PCT/KR2014/005440 dated Sep. 26, 2014.
International Written Opinion for Application No. PCT/KR2014/005441 dated Sep. 23, 2014.
IPO Search Report from Taiwan Application No. 103121222, dated Apr. 20, 2016.

\* cited by examiner

SUBSTRATE FILM

CROSS-REFERENCE TO RELATED APPLICATION

This application is a national phase entry under 35 U.S.C. §371 of International Application No. PCT/KR2014/005441, filed Jun. 19, 2014, which claims priority to Korean Patent Application No. 10-2013-0070530, filed Jun. 19, 2013 and Korean Patent Application No. 10-2013-0124858, filed on Oct. 18, 2013, the disclosures of which are incorporated herein by reference.

FIELD

The present application relates to a substrate film, a laminate, and a method of manufacturing a polarizing film.

BACKGROUND

A method of manufacturing a polarizing film in which a dichroic material is adsorbed or oriented in a polyvinyl alcohol-based resin (hereinafter referred to as a "PVA resin") layer is well-known. Polarizing films are typically used for display devices such as a liquid crystal display (LCD). For example, a PVA resin-based polarizing film generally having a thickness of about 60 □m to 80 □m is adhered to both surfaces of a liquid crystal panel of the LCD.

PVA resins are hydrophilic. Therefore, the polarizing film is sensitive to changes in temperature or humidity, easily expands and contracts, and easily results in defects called curls. Accordingly, in order to suppress expansion and contraction and reduce an influence of temperature and humidity, a protection film is generally used by adhering to both surfaces of a PVA resin polarizing film. However, suppression of expansion and contraction is not easy when the polarizing film has a greater thickness, and stress is caused when the film is adhered to the liquid crystal panel and the like, which results in stains and the like on a screen. Also, recently, as demand for thin devices or devices having low energy consumption increases, demand for thinner polarizing films also increases.

A process of manufacturing a thin polarizing film is disclosed in, for example, Patent Document 1 and the like.

PRIOR ART DOCUMENTS

Patent Document

Patent Document 1: Korea Patent No. 1175700

DESCRIPTION

Object

The present application provides a substrate film, a laminate, and a method of manufacturing a polarizing film.

Solution

The present application relates to a substrate film. An illustrative substrate film may be, for example, a film (hereinafter referred to as an "elongatable film" or "elongatable substrate film") used in a process of elongating a material capable of exhibiting a polarization function such as a PVA resin. In the above description, as illustrated in FIG. 1, for example, the elongating process may be performed such that, while a layer 102 (hereinafter referred to as a "polarizable material layer") including a material (hereinafter referred to as a "polarizable material") capable of exhibiting a polarization function due to elongation is laminated on either or both surfaces of a substrate film 101 to manufacture a laminate 100, the laminate is elongated.

In order to efficiently perform such an elongating process and obtain a highly-functional thin polarizing film, properties of the substrate film may be determined in consideration of properties of the polarizable material layer that is jointly elongated.

The properties of the substrate film may include, for example, various physical properties that may be measured by a tensile test. In general, an elongation curve confirmed in the tensile test may be classified as a load-versus-elongation curve displayed in a relation between an applied load and a degree of elongation (elongation, mm) or a stress-versus-strain curve displayed in a relation between an engineering stress and an engineering strain. Unless otherwise specifically defined, properties defined in this specification may be properties confirmed in the later curve, that is, the stress-versus-strain curve displayed in a relation between an engineering stress and an engineering strain.

In the present application, the elongation curve is illustrated by the following method. First, a sample in which the elongation curve will be measured is prepared to have a horizontal length of 15 mm and a vertical length of 70 mm. The horizontal and vertical lengths of the sample are lengths excluding a part fixed in a tensile tester for stretching. Then, the sample is fixed in the tensile tester, stretched at a tensile speed of about 300 mm/min in a vertical direction at room temperature until the sample is cut, and then a graph (X-axis: distance and Y-axis: force) of a force measured according to a distance until the sample is cut is illustrated. Then, the graph is converted into a graph (X-axis: elongation and Y-axis: tensile strength) of the elongation and the tensile strength by applying an area and a thickness of the sample, and each tensile property to be described may be measured from the converted graph. The term "room temperature" in this specification is a natural temperature without being artificially increased or decreased and may refer to a temperature of about 10° C. to 30° C., about 25° C., or about 23° C. Also, when physical properties are defined in this specification, the physical properties correspond to physical properties measured at room temperature unless otherwise specifically defined.

For example, in the substrate film, in order to prevent defects due to contraction after the polarizable material layer is elongated, which will be described later, the substrate film may need to satisfy the following Formula 1.

$$E/R \geq 5, \qquad \text{[Formula 1]}$$

In Formula 1, E is an elongation (unit: %) of the elongatable substrate film measured at room temperature, and R is a restoration ratio (unit: %). In the above description, the elongation may be obtained from the elongation curve that is obtained by performing the tensile test as described above at the measurement temperature.

Also, in the above description, the restoration ratio is measured such that a laminate manufactured by laminating a polyvinyl alcohol film having the same width and length as the substrate film and a thickness of 30 μm on a surface of the substrate film cut to a width of 50 mm and a length of 100 mm is elongated 5 times in a lengthwise direction in water (temperature: 60° C.), is taken out of the water, the polyvinyl alcohol film is removed, and the laminate is maintained for 1 hour at room temperature, a length (T) of the substrate film in a lengthwise direction is measured, and the measured value (T) is assigned to Formula [100×(T−A)/A]. In the Formula, A is a length of the substrate film before the elongation.

When the ratio (E/R) according to Formula 1 is adjusted to be included in the above range, a very thin polarizing film having an excellent polarization function or transmittance may be obtained through effective elongation in the elongation process to be described. In another example, the ratio (E/R) may be 10 or more, 15 or more, 20 or more, 25 or more, or 30 or more. In still another example, the ratio (E/R) may be 600 or less, 500 or less, 400 or less, 300 or less, 200 or less, 100 or less, 70 or less, 65 or less, 60 or less, 55 or less, 50 or less, 45 or less, or 40 or less.

The substrate film may satisfy Formula 1 and have the elongation in a range of about 200% to 1500%. In another example, the elongation may be about 250% or more, or about 300% or more. In still another example, the elongation may be about 1400% or less, 1300% or less, 1200% or less, 1100% or less, 1000% or less, 90% or less, 800% or less, 700% or less, 600% or less, or 550% or less.

The restoration ratio of the substrate film may also be 30% or less, 25% or less, or about 20% or less. The restoration ratio may also be about 5% or more, 10% or more, or 15% or more.

In the substrate film, an integral value of the elongation curve (a graph (X-axis: elongation and Y-axis: tensile strength) of the elongation and the tensile strength measured until the sample is stretched and cut) measured by the above method may be in a range of 2000 Nmm to 10,000 Nmm. In another example, the integral value may be 2500 Nmm or more, 3000 Nmm or more, 3500 Nmm or more, or 4000 Nmm or more. In still another example, the integral value may also be 9000 Nmm or less, 8000 Nmm or less, or 7600 Nmm or less. In such ranges, a very thin and highly-functional polarizing film may be beneficially formed in the elongating process to be described.

The tensile strength of the substrate film may be, for example, in a range of 45 MPa to 200 MPa. In another example, the tensile strength may be 50 MPa or more. In still another example, the tensile strength may be 150 MPa or 100 MPa or less. In such ranges, a very thin and highly-functional polarizing film may be beneficially formed in the elongating process to be described.

A yield point of the substrate film may be, for example, in a range of 10 MPa to 150 MPa. In another example, the yield point may be 15 MPa or more. In still another example, the yield point may be 100 MPa or less. In such ranges, a very thin and highly-functional polarizing film may be beneficially formed in the elongating process to be described.

An elastic limit of the substrate film may be, for example, in a range of 200 MPa to 1.000 MPa. In another example, the elastic limit may be 250 MPa or more, 300 MPa or more, or 350 MPa or more. In still another example, the elastic limit may be 900 MPa or less, 850 MPa or less, or 800 MPa or less. In such ranges, a very thin and highly-functional polarizing film may be beneficially formed in the elongating process to be described.

When the substrate film is selected in association with the polarizable material layer to satisfy at least one physical property among the above-described physical properties, it is possible to effectively manufacture a very thin polarizing film having a thickness of, for example, about 10 μm or less, about 8 μm or less, about 7 μm or less, about 6 μm or less, or about 5 μm or less by the elongating process and exhibiting a high functionality, and it is possible to effectively prevent tearing or curling of the polarizing film from occurring during the process.

The substrate film may be selected such that, for example, an absolute value of a difference (A−B) between an integral value (A) of the elongation curve and an integral value (B) of the polarizable material layer measured in the same manner is in a range of 1,500 Nmm to 10,000 Nmm. In another example, the absolute value of the difference may be 2,000 Nmm or more, 2,500 Nmm or more, 3,000 Nmm or more, 3,500 Nmm or more, or about 4,000 Nmm or more. Also, in still another example, the absolute value of the difference may be about 9,000 Nmm or less, 8,000 Nmm or less, 7.000 Nmm or less, or 6.500 Nmm or less.

For example, the substrate film may be selected such that an absolute value of a difference between the tensile strength thereof and the tensile strength of the polarizable material layer is in a range of about 0.5 MPa to 40 MPa. In the above description, the tensile strength refers to a value that is obtained by dividing a maximum tensile load at which the sample is broken in the tensile test by a cross-sectional area of the sample before stretching.

For example, the substrate film may be selected such that an absolute value of a difference between the elongation thereof and the elongation of the polarizable material layer is in a range of 15% to 500%. In another example, the absolute value of the difference may be 20% or more. Also, in still another example, the absolute value of the difference may be 400% or less, 300% or less, 200% or less, or 160% or less.

For example, the substrate film may be selected such that an absolute value of a difference between the yield point thereof and the yield point of the polarizable material layer is in a range of 1 MPa to 50 MPa. In another example, the absolute value of the difference may be 3 MPa or more or 5 MPa or more. Also, in still another example, the absolute value of the difference may be 45 MPa or less, 40 MPa or less, or 35 MPa or less.

For example, the substrate film may be selected such that an absolute value of a difference between the elastic limit thereof and the elastic limit of the polarizable material layer is in a range of 1,000 MPa or less. In another example, the absolute value of the difference may be 50 MPa or more, 100 MPa or more, 150 MPa or more, 200 MPa or more, or 230 MPa or more. Also, in still another example, the absolute value of the difference may be 900 MPa or less, 800 MPa or less, 700 MPa or less, or 660 MPa or less.

Kinds of the substrate film are not specifically limited, as long as the film is selected to satisfy at least one physical property among the above-described properties. Examples of the substrate film may include a cellulose-based film such as triacetyl cellulose (TAC); a polyether sulfone-based film; a polyolefin such as a polyolefin film such as a polyethylene or polypropylene film, an ethylene vinyl acetate copolymer film, an ethylene-alkyl (meth) acrylate copolymer (in the above description, alkyl may refer to an alkyl group having 1 to 4 carbon atoms) film, an ethylene-alpha-olefin copolymer film, or a propylene-alpha-olefin copolymer film; a polyvinylchloride film; an elastomer film; an acrylic film; or a substrate film made of a polymer such as urethane and the like. However, for example, since an amorphous poly(ethylene terephthalate) (PET) film or films such as polymethylpentene show a tensile behavior different from a PVA-based resin layer which is a general purpose polarizable material layer which will be described later, it is inappropriate.

As an example that may be used as the substrate film, a thermoplastic polyurethane film (hereinafter referred to as a "thermoplastic polyurethane (TPU) film") may be used. In this specification, the TPU film may refer to a single layer film including the TPU film as a main component or a multi-layer structure film including at least the TPU film. The TPU film may be a non-elongated film or a uniaxially, biaxially or multiaxially elongated film. As the TPU film, a polyester TPU film, a polyether TPU film, a polycaprolactone TPU film, and the like are known. An appropriate type may be selected from among these known materials in consideration of the above properties. For example, as the substrate film, the polyester TPU film may be used. As the TPU film, an aromatic or aliphatic TPU film may be used.

In general, the TPU film is manufactured by reacting a polyol component, a polyisocyanate component, and a chain extender component. The TPU film manufactured in this manner includes a soft segment and a hard segment. In general, a main component of the soft segment is the polyol component, and the hard segment includes a urethane bond or a urea bond generated by a reaction of the polyisocyanate and the chain extender and an unreacted portion of these components. Therefore, in the TPU film, a ratio of soft and hard segments is adjusted by controlling the source components, and thereby control may be easily performed to secure the above-described tensile properties and the like. Therefore, the TPU film used as the substrate film may be a reaction product of a mixture including the polyol, the polyisocyanate, and the chain extender.

Kinds of the polyol included in the mixture are not specifically limited. For example, in general, as the polyol used in formation of the soft segment, at least one component selected from the group consisting of aliphatic or aromatic polyether glycol, aliphatic or aromatic polyester glycol, and polycaprolactoneglycol may be used. For example, the polyester polyol may be generated by reacting a dibasic acid such as adipic acid, sebasic acid, isophthalic acid, dimethyl terephthalate, terephthalic acid, dimethyl phthalate, phthalic acid, dimethyl isophthalic acid, dimethyl naphthalene 2,6-dicarboxylic acid, oxalic acid, malonic acid, succinic acid, glutaric acid, azelaic acid, nona acid, or dodeca-deca acid with glycol. In consideration of guaranteeing the above-described physical properties or ease of adjustment, as the polyol, a polyol having a weight-average molecular weight in a range of about 500 to 5,000 may be used.

Kinds of the chain extender included in the mixture are not specifically limited. In general, a component used in formation of the hard segment may be used. As such a component, ethylene glycol, 1,6-hexanediol, 1,4-butanediol, 1,5-pentanediol, 1,6-pentanediol, neopentyl glycol, or an aliphatic diol having 1 to 20 carbon atoms, 1 to 16 carbon atoms, 1 to 12 carbon atoms, or 1 to 8 carbon atoms such as 1,4-cyclohexanedimethanol may be exemplified.

Kinds of a polyisocyanate compound included in the mixture are not specifically limited. In general, a component used in formation of the hard segment may be used. As such a component, toluene diisocyanate, xylene diisocyanate, diphenyl methane diisocyanate, hexamethylene diisocyanate, isophorone diisocyanate, tetramethyl xylene diisocyanate, methylene diphenyl diisocyanate, or an aliphatic or aromatic diisocyanate such as naphthalene diisocyanate may be exemplified but the component is not limited thereto.

The mixture may further include various components that are known to be applied in manufacture of the TPU film in addition to the above-described component.

A ratio of the components in the mixture is not specifically limited. The ratio may be selected such that soft and hard segments in the TPU film are included at an appropriate ratio to exhibit the above-described properties. In an example, the total weight of the polyisocyanate component and the chain extender in the mixture may be in a range of about 1 part by weight to 90 parts by weight with respect to 100 parts by weight of the polyol component. In this specification, unless otherwise specifically defined, the unit "parts by weight" refers to a weight ratio between components. For example, the mixture may include the polyisocyanate compound at 1 part by weight to 50 parts by weight or 5 parts by weight to 45 parts by weight with respect to 100 parts by weight of the polyol component and the chain extender at about 0.1 part by weight to 30 parts by weight or about 0.5 parts by weight to 20 parts by weight with respect to 100 parts by weight of the polyol component. In such ranges, soft and hard segments in the TPU film may be included at an appropriate ratio, intended in this specification.

A method of manufacturing the TPU by a reaction of the mixture, and a method of manufacturing a film using the TPU are not specifically limited. Known methods of manufacturing the TPU and the film may be used without limitation.

A thickness of the substrate film is not specifically limited and may be selected in a range exhibiting the above-described properties. For example, the thickness may be in a range of about 50 μm to 300 μm or about 100 μm to 200 μm, but the thickness is not limited thereto.

The present application also provides a laminate including the substrate film and a polarizable material layer formed on either or both surfaces of the substrate film, for example, an elongatable laminate. The laminate is elongated to form a film (hereinafter referred to as a "polarizing film") exhibiting a polarization function.

Kinds of the polarizable material layer are not specifically limited, as long as a polarization function due to elongation exhibits, for example, a function that can extract only light oscillating in a direction from incident light oscillating in several directions. Typically, a layer including the PVA-based resin may be exemplified. The PVA-based resin may be obtained by, for example, gelation of a polyvinyl acetate-based resin. In this case, the polyvinyl acetate-based resin to be used may include a homopolymer of vinyl acetate and a copolymer of vinyl acetate and another monomer that can be copolymerizable therewith. In the above description, examples of a monomer copolymerizable with vinyl acetate include unsaturated carboxylic acids, olefins, vinyl ethers, unsaturated sulfonic acids, acrylamides having an ammonium group, or mixtures thereof, but the monomer is not limited thereto. In general, a degree of gelation of the PVA-based resin is about 85 mol % to 100 mol % or 98 mol % or more, but the degree is not limited thereto. The PVA-based resin may be further modified. For example, polyvinyl formal, polyvinyl acetal, and the like which are modified to aldehydes may be used. In general, a degree of polymerization of the PVA-based resin may be about 1,000 to 10,000 or 1,500 to 5,000.

A method of forming the polarizable material layer including the PVA-based resin and the like on either or both surfaces of the substrate film is not specifically limited. For example, a method in which a coating solution prepared by dissolving a material such as the PVA-based resin in a solvent, for example, water, is applied to the substrate film may be used, or a method in which a film (hereinafter referred to as a "polarizable film") formed by film-formation of a source such as the PVA-based resin, for example, a PVA-based resin film, is laminated on the substrate film may be used. The method is not specifically limited but the method of adhering the polarizable film to the substrate film among the above methods may be used in consideration of an appropriate elongating process and a function of the polarizing film obtained after the elongation. In the process, lamination of the polarizable film may be directly performed on the substrate film without a separate layer or performed using an adhesive and the like. Kinds of the adhesive layer to be used in the process are not specifically limited. For example, a water-based PVA-based adhesive layer and the like generally used in adhering a polarizing film and a protection film in manufacture of a polarizing plate may be used. Also, a known bonding facilitating treatment such as corona treatment or primer treatment may be performed on a surface of the substrate film on which the polarizable material layer is formed.

A dichroic material may be adsorbed in the polarizable material layer of the laminate. As the dichroic material, any kind of material that is known to exhibit appropriate dichroism in the process of manufacturing the polarizing film may be used. Examples of the dichroic material may include iodides, organic dyes, and mixtures thereof. In the above description, examples of the iodides may include lithium iodide, sodium iodide, zinc iodide, aluminum iodide, lead iodide, copper iodide, valium iodide, calcium iodide, tin iodide, titanium iodide, and the like, but the iodides are not limited thereto.

A thickness (a thickness before elongation) of the polarizable material layer in the laminate is not specifically limited, and may be selected in an appropriate range in consideration of the thickness after elongation. For example, the thickness of the polarizable material layer may be in a range of 15 μm to 100 μm. In another example, the thickness may be in a range of 20 μm to 90 μm, 20 μm to 80 μm, 20 μm to 70 μm, 20 μm to 60 μm, 20 μm to 50 μm, or 20 μm to 40 μm.

The present application also provides a method of manufacturing a polarizing film including elongation of a laminate that contains the substrate film and the polarizable material layer formed on either or both surfaces of the substrate film.

Before the laminate is elongated, a dyeing process in which the polarizable material layer is dyed with the exemplified dichroic material as described above may be performed. The dyeing process may be performed by, for example, immersing the laminate in a dye solution. The dye solution may be prepared by, for example, dissolving any of the above-described dichroic materials in a solvent. In general, water is used as the solvent of the dye solution. A ratio of the dichroic material in the dye solution is not specifically limited. In general, the dye solution may include the dichroic material at about 0.1 to 4.3 parts by weight with respect to 100 parts by weight of the solvent. As the dichroic material, any of the above-described materials may be used. When iodine is used as the dichroic material, iodides may be further included in the dye solution in order to facilitate dissolution of the iodine and improve dyeing efficiency. In general, the iodides may be added at a ratio of about 0.02 parts by weight to 20 parts by weight or 0.1 part by weight to 10 parts by weight with respect to 100 parts by weight of the solvent, but the ratio is not limited thereto. As the iodides, potassium iodide, lithium iodide, sodium iodide, zinc iodide, aluminum iodide, lead iodide, copper iodide, barium iodide, calcium iodide, tin iodide, titanium iodide, and the like may be exemplified, but the iodides are not limited thereto. In general, an immersing time in the dye solution is about 5 seconds to 5 minutes and a temperature of the dye solution in the process may be generally in a range of 20° C. to 50° C., but the time and the temperature are not limited thereto.

The elongating process may be performed after the dyeing process or with no dyeing process. A method of performing the elongating process is not specifically limited and a known-method may be used. Elongation of the laminate may be performed in a solution, for example, an aqueous solution. A temperature of the solution in which the elongating process is performed is not specifically limited as long as appropriate elongation may be performed, and may be generally in a range of 85° C. or less, 20° C. to 70° C., or 30° C. to 65° C. The elongation may be performed such that a thickness of an elongated polarizing film is in a range of about 10 μm or less, about 8 μm or less, about 7 μm or less, about 6 μm or less, or about 5 μm or less. A lower limit of the thickness of the elongated polarizing film is not specifically limited, and may be, for example, about 0.5 μm or more, 1 μm or more, 1.5 μm or more, 2 μm or more, or 2.5 μm or more. Accordingly, the elongation may be performed at a draw ratio, for example, about 2 times to 15 times, or about 5 times to 15 times an original length. In a range of the above-described draw ratio, the polarizable material layer or the dichroic material of the polarizing film may be appropriately oriented.

The elongating process may be performed along with a cross-linking process as necessary. The cross-linking process may be performed by, for example, immersing the laminate in a boric acid solution. When the elongating process is performed in the boric acid solution, elongation may be performed along with cross-linking. The cross-linking process is a process of insolubilizing the swollen polarizable material layer or the PVA-based resin of the polarizing film to be insoluble in water.

The boric acid solution may be obtained by dissolving boric acid or a borate in water serving as a solvent. In addition to the boric acid or the borate, a compound such as boron, glyoxal, glutaraldehyde, and the like may be used. A concentration of the boric acid is not specifically limited, and generally, is adjusted to a ratio of the boric acid of 1 part by weight to 10 parts by weight with respect to 100 parts by weight of water. In the boric acid solution, for example, in order to suppress iodine adsorbed into the PVA-based resin layer which is a material of the polarizable layer from eluting, iodides may be added. In general, a concentration of the iodides may be 0.05 wt % to 15 wt % or 0.5 wt % to 8 wt %. As the iodides, the material described in the above dyeing process may be used. In general, an immersing time in the boric acid solution is about 15 seconds to 5 minutes. In general, a temperature of the boric acid solution may be in a range of 20° C. to 70° C.

The above-described cross-linking process may be performed earlier than the dyeing process. In such a case, processes may be performed in the order of cross-linking using the boric acid solution, dyeing, and elongation. When the thin polarizing film is manufactured, a material of the polarizable material layer, for example, the PVA-based resin, may be dissolved in the dye solution during the dyeing process. Therefore, when the cross-linking process is performed earlier than the dyeing process, it may be effective. In order to supplement the boric acid missing during the dyeing process, a cross-linking process using a separate boric acid solution may be performed in a process before the elongating process, as necessary.

A cleaning process may be performed after the elongating process. The cleaning process is a process of washing residues of a laminate film including the elongated polarizing film. When this treatment is insufficient, the boric acid may be separated from the thin polarizing film after the laminate is dried. For example, the cleaning may be performed in a cleaning solution including potassium iodide in order to prevent a material such as the PVA-based resin from dissolving. In general, a concentration of the potassium iodide in the cleaning solution may be about 0.5 wt % to 10 wt %. In general, a temperature of the cleaning solution may be about 10° C. to 50° C. and in general, an immersing time may be about 1 second to 1 minute, but the temperature and the time are not limited thereto.

Subsequently, the drying process may be performed. The drying process may be performed by an appropriate known method, for example, a method of natural drying, blow drying, or heat drying. A drying temperature and time are not specifically limited, but is adjusted to perform appropriate drying.

The laminate including the elongated polarizing film may be used without change, or may be used after the substrate film is released as necessary. As necessary, the substrate film is released from the polarizing film through an appropriate transfer process, and the substrate film may be transferred to another optical functional film.

Effect

The present application provides a substrate film capable of effectively manufacturing a polarizing film having a thickness of about 10 μm or less, about 8 μm or less, about 7 μm or less, about 6 μm or less, or about 5 μm or less and having an excellent function such as polarization performance, a laminate, and a method of manufacturing the same. According to the invention, it is possible to prevent tearing, curling, or the like from occurring in the elongation process and manufacture a polarizing film by easily elongating a polarization material such as the PVA-based resin.

ILLUSTRATIVE EMBODIMENTS

Figure 1:
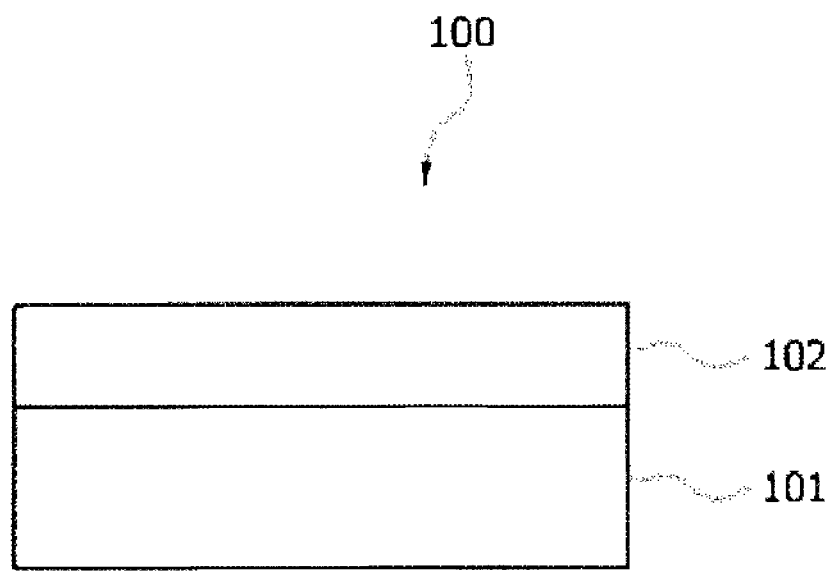
FIG. 1 is a cross sectional view of an illustrative laminate.

Hereinafter, the above will be described in detail with reference to the examples and comparative examples, but the scope of the application is not limited to the following Examples.

Physical properties in examples and comparative examples were evaluated by the following methods.
1. Evaluation of Tensile Properties Tensile properties of a substrate film or a polarizable material layer (a PVA-based resin film in the examples and comparative examples) were evaluated by the following methods. A sample was prepared by cutting a substrate film or a polarizable material layer in Example or Comparative Example to a horizontal length of 15 mm and a vertical length of 90 mm. Then, 10 mm of a top and 10 mm of a bottom in a vertical direction were taped and wrapped and then the taped part was fixed in a measurement device (XP plus, commercially available from TA). Then, while the sample was stretched in a vertical direction at mom temperature and a tensile speed of 300 mm/min, a graph (X-axis: distance and Y-axis: force) of a force measured according to a distance until the sample is cut was illustrated. An area and a thickness of the sample were applied so that the graph was shown as a graph (X-axis: elongation and Y-axis: tensile strength) of an elongation and a tensile strength, and then each of the tensile properties was evaluated based on the graph. A method of evaluating tensile properties such as a tensile elastic modulus, a tensile elastic coefficient, and an elongation from an elongation curve is known.
2. Evaluation of Restoration Ratio A restoration ratio was evaluated by the following method. First, a substrate film of the examples or comparative examples was cut to a horizontal length of 50 mm and a vertical length of 100 mm. Then, a polyvinyl alcohol film having the same horizontal and vertical lengths as the substrate film and a thickness of 30 μm was adhered to a surface of the substrate film to manufacture a laminate. In the above description, a typical water-based polyvinyl alcohol-based adhesive was used to adhere the polyvinyl alcohol film to the substrate film. Then, the laminate was immersed in water (temperature: 60° C.) and then was elongated 5 times in a vertical direction. Then, the laminate was taken out of the water and the polyvinyl alcohol film was released. The laminate was maintained at room temperature for 1 hour, and a length (T) of the substrate film in a vertical direction was measured. Then, the measured length (T) was assigned to Formula $[100\times(T-A)/A]$ to calculate a restoration ratio. In the Formula, A denotes a vertical length of the substrate film before elongation.
3. Evaluation of Melt Index (MI)

According to the ASTM D1238 standard, a melt index was measured by a weight of a specimen passing through an orifice having a diameter of 2.095 mm at a temperature of 215° C. during 10 minutes using 500 g of load (unit: g/10 min).
4. Evaluation of Hardness Hardness was measured using a sample having a thickness of 2 mm at room temperature by a Shore D durometer (ASKER Co., Ltd., Japan).

Manufacturing Example 1

Manufacture of Base Film (TPU Film (A))

A TPU film was manufactured using a mixture which includes a polyester polyol prepared by known esterification of adipic acid and 1,4-butane diol and having a weight-average molecular weight (Mw) of about 2,000, methylene diphenyl diisocyanate (MDI) and 1,4-butanediol (chain extender) by a known-method. Specifically, the polyester-based polyol and the MDI were added at a weight ratio (polyester-based polyol:MDI) of 1:1.46 to a reactor. A reaction of the resulting mixture while stirring and adding nitrogen at 80° C. at a speed of 200 rpm was used to prepare an isocyanate terminated prepolymer. Then, the chain extender (1,4-butanediol) was additionally added at 14 parts by weight with respect to 100 parts by weight of the prepolymer and reacted while stirring and adding nitrogen at 80° C. and a speed of 200 rpm until a content of an isocyanate (—NCO) in the reactor became 0 to synthesize TPU. The synthesized TPU was casted to manufacture a TPU film having a thickness of about 50 μm.

Manufacturing Example 2

Manufacture of Base Film (TPU Film (B))

A TPU film having a thickness of about 50 μm was manufactured in the same manner as in Manufacturing Example 1 except that 1,4-butanediol (BD) and neopentane glycol (NPG) mixed at a weight ratio of 1:0.5 (BD:NPG) were used as a chain extender.

Manufacturing Example 3

Manufacture of Base Film (TPU Film (C))

A TPU film having a thickness of about 50 μm was manufactured in the same manner as in Manufacturing Example 1 except that 1,4-butanediol (BD) and neopentane glycol (NPG) mixed at a weight ratio of 1:1.5 (BD:NPG) were used as a chain extender.

Properties of each manufactured film were summarized and shown in the following Table 1.

TABLE 1

|  | TPU film | | | PVA-based resin film | Amorphous PET film |
| --- | --- | --- | --- | --- | --- |
|  | A | B | C |  |  |
| Elongation curve integral value | 4343 | 7317 | 5404 | 1566 | 728 |
| Tensile strength | 51 | 83 | 53 | 53 | 66 |
| Elongation | 378 | 491 | 413 | 519.8 | 6.8 |
| Yield point | 22 | 83 | 46 | 53 | 66 |
| Elastic limit | 545 | 390 | 754 | 120 | 1404 |
| Restoration ratio | 19 | 18.8 | 11.3 | — | — |
| MI | 30 | 30 | 30 | — | — |
| Hardness | 80D | 75D | 75D | — | — |

Elongation curve integral value unit: Nmm
Tensile strength: MPa
Elongation unit: %
Elongation unit: MPa
Elastic limit unit: MPa
Restoration ratio unit: %
MI (based on 215° C. and 5 Kg) unit: g/10 min
PVA-based resin film: film formed by film-formation using known PVA-based resin used in manufacture of polarizing film (thickness: about 30 μm)
Amorphous PET film (manufacturer: LG Hausys, Ltd.)

Example 1

The PVA-based resin film shown in Table 1 was laminated on a surface of the TPU film (A) manufactured in Manufacturing Example 1 using a water-based PVA-based adhesive to manufacture a laminate. Then, the laminate was immersed in a dye solution (solvent: water) including iodine and potassium iodide at a temperature of about 30° C. for an appropriate time and iodine was adsorbed into the PVA-based resin film. A content of the iodine in the dye solution was about 0.1 part by weight with respect to 100 parts by weight of water and a content of the potassium iodide was at about 0.7 parts by weight with respect to 100 parts by weight of water. Then, the laminate was immersed in a boric acid solution including boric acid and potassium iodide at a temperature of about 60° C., and elongated until a thickness of a final PVA-based resin film became about 5.8 μm (draw ratio: about 5.6 times an original length). The PVA-based resin film was released from the elongated laminate for measurement. The result showed that a polarizing film having a transmittance of about 40% or more and a degree of polarization of 99% or more was manufactured.

Example 2

A polarizing film was manufactured in the same manner as in Example 1 except that the TPU film (B) manufactured in Manufacturing Example 2 was used. A transmittance of the manufactured polarizing film was about 40% or more and a degree of polarization thereof was about 99% or more.

Example 3

A polarizing film was manufactured in the same manner as in Example 1 except that the TPU film (C) manufactured in Manufacturing Example 3 was used. A transmittance of the manufactured polarizing film was about 40% or more and a degree of polarization thereof was about 99% or more.

Comparative Example 1

A polarizing film was manufactured in the same manner as in Example 1 except that the amorphous PET film shown in Table 1 was used instead of the TPU film. However, in this case, as a draw ratio increases, the PVA-based resin film was broken or severely curled, and thereby it was unable to manufacture a polarizing film having an appropriate performance.

EXPLANATION OF MARKS

100: laminate
101: substrate film
102: polarizable material layer or polarizing film

What is claimed is:

1. A laminate, comprising:
   an elongatable substrate film satisfying the following Formula 1; and
   a polarizable material layer formed on either or both surfaces of the substrate film,
   wherein an absolute value of a difference (A–B) between an integral value (A) of an elongation curve of the substrate film and an integral value (B) of an elongation curve of the polarizable material layer is in a range from 1,500 to 10,000 Nmm:

$$E/R \geq 5,\qquad\text{[Formula 1]}$$

where, in Formula 1, E denotes an elongation having an unit of % of the elongatable substrate film measured at room temperature, R denotes a restoration ratio having an unit of %, the restoration ratio is measured such that a laminate manufactured by adhering a polyvinyl alcohol film having the same horizontal and vertical lengths as the substrate film and a thickness of 30 μm to a surface of the substrate film cut to a horizontal length of 50 mm and a vertical length of 100 mm is elongated 5 times in a vertical direction in water having a temperature of 60° C., is taken out of the water, the polyvinyl alcohol film is released, the laminate is maintained for 1 hour at room temperature, a length (T) of the substrate film in a vertical direction is measured, and the measured value is assigned to Formula [100× (T–A)/A], where A in the Formula is a vertical length of the substrate film before the elongation,
   wherein the elongation of the substrate film is in a range of 200% to 1500%, and the substrate film comprises a thermoplastic polyurethane.

2. The laminate of claim 1,
   wherein the tensile strength of the substrate film is in a range of 20 MPa to 200 MPa.

3. The laminate of claim 1,
   wherein an integral value of the elongation curve of the substrate film is in a range of 2000 Nmm to 10,000 Nmm.

4. The laminate of claim 1,
wherein a yield point of the substrate film is in a range of 10 MPa to 150 MPa.

5. The laminate of claim 1,
wherein an elastic limit of the substrate film is in a range of 200 MPa to 1,000 MPa.

6. The laminate of claim 1,
wherein the thermoplastic polyurethane is a reaction product of a mixture including a polyol, a polyisocyanate compound, and a chain extender.

7. The laminate of claim 6,
wherein the polyol has a weight-average molecular weight in a range of 500 to 5,000.

8. The laminate of claim 6,
wherein the total weight of the polyisocyanate compound and the chain extender in the mixture is in a range of about 1 part by weight to 90 parts by weight with respect to 100 parts by weight of the polyol.

9. The laminate of claim 6,
wherein the mixture includes the polyisocyanate compound of 1 part by weight to 50 parts by weight with respect to 100 parts by weight of the polyol.

10. The laminate of claim 6,
wherein the mixture includes the chain extender at 0.1 part by weight to 30 parts by weight with respect to 100 parts by weight of the polyol.

11. The laminate of claim 1,
wherein the polarizable material layer is a polyvinyl alcohol-based resin-containing film or coating layer.

12. The laminate of claim 1,
wherein the polarizable material layer has a thickness in a range of 15 µm to 100 µm.

13. A method of manufacturing a polarizing film comprising elongating the laminate of claim 1.

14. The method of claim 13,
wherein the elongating the laminate is performed at a draw ratio in a range of 2 times to 15 times an original length.

15. The method of claim 13,
wherein the elongating the laminate is performed in an aqueous solution in a range of 20° C. to 80° C.

16. The method of claim 15,
wherein the aqueous solution is a boric acid solution.

17. The method of claim 13,
wherein the polarizable material layer has a thickness of 10 µm or less after the elongation.

18. A laminate, comprising:

an elongatable substrate film satisfying the following Formula 1; and a polarizable material layer formed on either or both surfaces of the substrate film:

$$E/R \geq 5,$$ [Formula 1]

where, in Formula 1, E denotes an elongation having an unit of % of the elongatable substrate film measured at room temperature, R denotes a restoration ratio having an unit of %, the restoration ratio is measured such that a laminate manufactured by adhering a polyvinyl alcohol film having the same horizontal and vertical lengths as the substrate film and a thickness of 30 µm to a surface of the substrate film cut to a horizontal length of 50 mm and a vertical length of 100 mm is elongated 5 times in a vertical direction in water having a temperature of 60° C., is taken out of the water, the polyvinyl alcohol film is released, the laminate is maintained for 1 hour at room temperature, a length (T) of the substrate film in a vertical direction is measured, and the measured value is assigned to Formula [100×(T−A)/A], where A in the Formula is a vertical length of the substrate film before the elongation, and wherein the substrate film is not amorphous and comprises a thermoplastic polyurethane.

* * * * *